(12) United States Patent
Hou et al.

(10) Patent No.: US 11,413,584 B2
(45) Date of Patent: Aug. 16, 2022

(54) FUNCTIONAL FLUID GATE CONTROL SYSTEM

(71) Applicant: Xiamen University, Fujian (CN)

(72) Inventors: Xu Hou, Fujian (CN); Zhizhi Sheng, Fujian (CN); Lizhi Huang, Fujian (CN); Lingli Min, Fujian (CN); Miao Wang, Fujian (CN); Yinglin Zhu, Fujian (CN); Feng Wu, Fujian (CN)

(73) Assignee: Xiamen University, Fujian (CN)

( * ) Notice: Subject to any disclaimer, the term of this patent is extended or adjusted under 35 U.S.C. 154(b) by 246 days.

(21) Appl. No.: 16/612,105

(22) PCT Filed: May 15, 2018

(86) PCT No.: PCT/CN2018/086892
§ 371 (c)(1),
(2) Date: Mar. 9, 2020

(87) PCT Pub. No.: WO2018/210239
PCT Pub. Date: Nov. 22, 2018

(65) Prior Publication Data
US 2020/0206692 A1    Jul. 2, 2020

(30) Foreign Application Priority Data

May 16, 2017    (CN) .......................... 201710342533.1

(51) Int. Cl.
*B01D 53/22*    (2006.01)
*B01D 67/00*    (2006.01)
(Continued)

(52) U.S. Cl.
CPC ......... *B01D 67/0093* (2013.01); *B01D 53/22* (2013.01); *B01D 71/36* (2013.01); *B01J 4/04* (2013.01); *B01D 2323/36* (2013.01)

(58) Field of Classification Search
CPC ........ B01J 4/04; B01D 71/36; B01D 67/0093; B01D 53/22; B01D 2323/36;
(Continued)

(56) References Cited

U.S. PATENT DOCUMENTS 3,211,645 A * 10/1965 Ferrari ................. B01D 61/147
                                                              210/637
3,252,272 A *  5/1966 Hazen .................... B01D 63/10
                                                               96/13
(Continued)

FOREIGN PATENT DOCUMENTS

CN    103062479 A    4/2013
CN    103062497 A    4/2013
(Continued)

OTHER PUBLICATIONS

International Search Report and Written Opinion with English Translation of ISR, cited in PCT/CN2018/086892 dated Jul. 20, 2018, 9 pages.

(Continued)

*Primary Examiner* — Anthony R Shumate
(74) *Attorney, Agent, or Firm* — Cooper Legal Group, LLC

(57) ABSTRACT

The present disclosure discloses a functional fluid gating control system, which comprises a porous membrane and a functional fluid. The functional fluid at least partially infiltrates the porous membrane and cooperates to form a fluid gating pathway. The functional fluid and/or the porous membrane responds to at least one stimulus and undergoes a physical change or a chemical change to change the threshold pressure of the transport substance. A transport fluid being immiscible with the functional fluid is controlled to pass through the fluid gating system, and thus controllable transport and multiphase separation of materials are achieved. The stimulus of the present disclosure comprises (Continued)

a wide range of sources, and the stimulus responsiveness of the functional fluid and the porous membrane can be randomly and freely combined to adapt to multiple stimuli from complex external conditions and achieve intelligent controllability.

14 Claims, 3 Drawing Sheets

(51) Int. Cl.
*B01D 71/36* (2006.01)
*B01J 4/04* (2006.01)

(58) Field of Classification Search
CPC ............ B01D 63/087; B01D 2275/302; B01D 2323/18; B01D 15/3885; B01D 2325/46
See application file for complete search history.

(56) References Cited

U.S. PATENT DOCUMENTS

| | | | | |
|---|---|---|---|---|
| 4,092,232 | A * | 5/1978 | Zetter | G01N 27/4162 204/415 |
| 4,124,458 | A * | 11/1978 | Moeglich | B01D 69/12 205/521 |
| 4,179,079 | A * | 12/1979 | Johanns | G03B 17/26 242/526 |
| 4,375,415 | A * | 3/1983 | Lavender | A61M 1/3496 210/321.6 |
| 4,439,901 | A * | 4/1984 | Eddleman | B01D 61/30 24/270 |
| 4,722,564 | A * | 2/1988 | Witte | B23Q 3/086 221/210 |
| 5,053,132 | A * | 10/1991 | Sirkar | B01D 67/0093 210/500.23 |
| 5,458,719 | A * | 10/1995 | Pall | B01D 39/1692 156/285 |
| 7,677,289 | B2 * | 3/2010 | Hayworth | G01N 1/312 156/447 |
| 9,636,631 | B1 * | 5/2017 | Maurice | B01D 69/02 |
| 9,963,597 | B2 * | 5/2018 | Aizenberg | A61L 31/14 |
| 2008/0016829 | A1 * | 1/2008 | Stahl | B01D 46/52 55/309 |
| 2008/0057263 | A1 * | 3/2008 | Chien | B32B 3/16 428/113 |
| 2009/0056542 | A1 * | 3/2009 | Carew | B01D 29/23 366/293 |
| 2010/0170776 | A1 * | 7/2010 | Ehrenberg | B01D 63/085 202/168 |
| 2011/0036237 | A1 * | 2/2011 | Okada | B01D 71/76 427/244 |
| 2011/0127206 | A1 * | 6/2011 | Meyer-Blumenroth | B01D 63/12 210/232 |
| 2012/0168369 | A1 * | 7/2012 | Van Medevoort | B29C 45/0053 210/335 |
| 2014/0238235 | A1 * | 8/2014 | Liu | B01D 63/084 95/52 |
| 2015/0000522 | A1 * | 1/2015 | Ahn | B01D 63/10 95/52 |
| 2015/0136606 | A1 * | 5/2015 | Tuteja | C02F 1/4696 204/627 |
| 2015/0231556 | A1 * | 8/2015 | Ahn | B01D 71/52 95/51 |
| 2017/0036923 | A1 * | 2/2017 | Cioanta | B01D 65/08 |
| 2018/0221824 | A1 * | 8/2018 | Visser | B01D 63/046 |
| 2018/0243697 | A1 * | 8/2018 | Feng | B01D 71/08 |
| 2019/0285187 | A1 * | 9/2019 | Yager | B01L 3/5029 |

FOREIGN PATENT DOCUMENTS

| | | |
|---|---|---|
| CN | 103075572 A | 5/2013 |
| CN | 103075573 A | 5/2013 |
| CN | 105758582 A | 7/2016 |
| WO | 0236230 A2 | 5/2002 |
| WO | 2016130558 A1 | 8/2016 |

OTHER PUBLICATIONS

Hou Xu, et a., "Liquid-based gating mechanism with tunable multiphase selectivity and antifouling behaviour", Nature, vol. 519, Mar. 4, 2015 (Mar. 4, 2015), ISSN:1476-4687, p. 70 and p. 72.
Hou Xu, "Smart gating Multi-Scale Pore/Channel-Based Membranes", Advanced Materials, vol. 28, No. 33, Jun. 14, 2016 (Jun. 14, 2016), ISSN:0935-9648, 7056-7057 pages.

* cited by examiner

FUNCTIONAL FLUID GATE CONTROL SYSTEM

FIELD OF THE DISCLOSURE

The present disclosure relates to a functional fluid gating control system belonging to the field of functional materials and devices.

BACKGROUND OF THE DISCLOSURE

There are various multi-scale pores in natural organisms, which can carry out material transport without clogging and play a unique role in the normal operation of life activities. For example, nanoscale water channels and ion channels are capable of selectively transporting molecules and ions. The liquid liner of lungs acts as a pressure-responsive gate for facilitating selective gas transport. The structure and function of these micro/nanoscale pores and channels provide new design ideas and physicochemical methods for the design of artificial, high-efficiency material separation and transport systems.

Fluid gating control systems transfer the scientific problems of traditional micro/nanoscale solid/gas and solid/liquid systems to solid/liquid/gas and solid/liquid/liquid systems. The addition of the gating fluid enables the transport and separation of the material to be carried out at the liquid-liquid interface, which overcomes the problem of membrane contamination by liquid-solid contact when being separated in the conventional porous membrane. The pressure-driven fluid gating control system uses a fluid that is stabilized in the microporous membrane by capillary force and can reversibly seal the pores in a closed state. Each transport substance has a particular gating threshold pressure. When the applied pressure reaches its threshold pressure, the gating fluid is quickly reconfigured to form a liquid-lined pore to achieve efficient and dynamic separation of the gas-liquid and air-water-oil three-phase mixture while enduring the membrane material's excellent anti-fouling properties.

However, the current application of the fluid gating control system that relies solely on the pressure to achieve material separation is greatly limited in real application. How to regulate and control the separation and transport of substances in a fluid gating control system based on porous membranes and functional fluids in complex external environments will play an important role in promoting the application of fluid gating control systems in real life.

BRIEF SUMMARY OF THE DISCLOSURE

The present disclosure provides a functional fluid gating control system, the functional fluid gating control system combines a functional fluid and a porous membrane based on a dynamic anti-fouling principle of a nuclear membrane of a cell membrane, and the functional fluid and/or the porous membrane responds to stimulus to form an intelligent responsive gate, which can efficiently and intelligently separate and regulate multiphase materials, the present disclosure is adaptable in fields of material separation, multiphase material transportation, sensors, energy conversion devices, etc.

A technical solution of the present disclosure is as follows:

A functional fluid gating control system comprises a porous membrane and a functional fluid. The functional fluid at least partially infiltrates the porous membrane and cooperates to form a fluid gating pathway. At least one of the functional fluid or the porous membrane responds to at least one stimulus and undergoes a physical change or a chemical change to change a pressure of the fluid gating passage to control a transport fluid to pass through the fluid gating pathway. The transport fluid and the functional fluid are immiscible.

In another preferred embodiment, the functional fluid gating control system further comprises an external field acting on at least one of the functional fluid or the porous membrane, wherein a change in the external field forms the stimulus.

In another preferred embodiment, the external field comprises at least one of an optical field, a magnetic field, an acoustic field, an electrical field, a temperature, or a stress.

In another preferred embodiment, hydrophilicity, viscosity, or morphology of the functional fluid changes as the external field changes.

In another preferred embodiment, a pore size, a chemical structure, or wettability of the porous membrane changes as the external field changes.

In another preferred embodiment, the at least one of the functional fluid or the porous membrane responds to a chemical stimulus.

In another preferred embodiment, the chemical stimulus comprises a change in ion concentration or biomolecular concentration.

In another preferred embodiment, the functional fluid gating control system further comprises a body having a chamber. The porous membrane and the functional fluid are disposed in the chamber. The chamber comprises a material transport inlet and a material separation outlet located on opposite sides of the fluid gating passage. The transport fluid enters the chamber from the material transport inlet, and the transport fluid is transported through the material separation outlet.

In another preferred embodiment, the chamber further comprises a material transport outlet. The material transport outlet and the material transport inlet are located on the same side of the porous membrane. A fluid mixture with at least two components is introduced into the chamber from the material transport inlet, and a component other than the transport fluid flows from the material transport outlet to achieve material separation.

In another preferred embodiment, the body comprises a sealing material and a clamping device. The clamping device comprises an upper clamping member and a lower clamping member. The sealing material is disposed between the upper clamping member and the lower clamping member to form the chamber.

The porous membrane comprises metallic membranes, ceramic membranes, polymeric membrane, composite membranes, and the metallic membranes. The ceramic membranes, the polymeric membrane, and the composite membranes may be modified with a stimuli-responsive functional group.

The beneficial effects of the present disclosure are as follows:

1. The functional fluid gating control system of the present disclosure forms a fluid gate responding to a certain stimulus by selecting and matching a functional fluid and a porous membrane. The functional fluid and/or the porous membrane responds to a stimulus and undergoes a physical change or a chemical change to change the threshold pressure of a transport substance, forming a liquid-lined pathway. The target transport material passes through the fluid gating pathway to achieve controlled transport of material separation of multiple components and provide a new design concept for liquid degassing, gas-liquid separation, oil-water separation, wastewater treatment, etc. Sources of stimulus comprise a physical external field and chemical stimulus. Stimulus responsiveness of the functional fluid and the porous membrane is configured to be freely and randomly combined, complex external conditions controlled by multiple stimuli are adapted, and intelligent controllability is achieved.

2. The functional fluid and/or the porous membrane of present disclosure respond to external stimulus. Controllable transport and multiphase material separation are achieved by controlling external conditions. The stimulus can be a change of non-contact energy. A status of the transport fluid is not needed to be changed, and a system structure and control conditions are simplified.

3. The system can be applied to a variety of material combinations of the functional fluid and the porous membrane and can be applied to a wide range of external stimulus with flexible combinations and free selection, adaptable to practical applications.

BRIEF DESCRIPTION OF THE DRAWING

The present disclosure will be further described in detail below with the combination of the accompanying drawings and embodiments. However, a functional fluid gating control system of the present disclosure will not be limited to the embodiments.

DETAILED DESCRIPTION OF THE EMBODIMENTS

Figure 1:
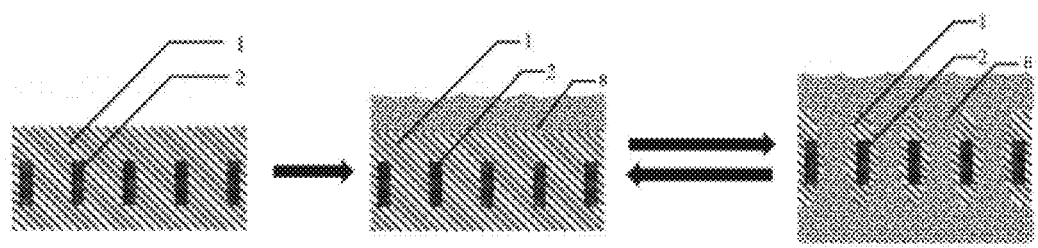
FIG. 1 illustrates a schematic diagram of a principle of the present disclosure.
Figure 2:
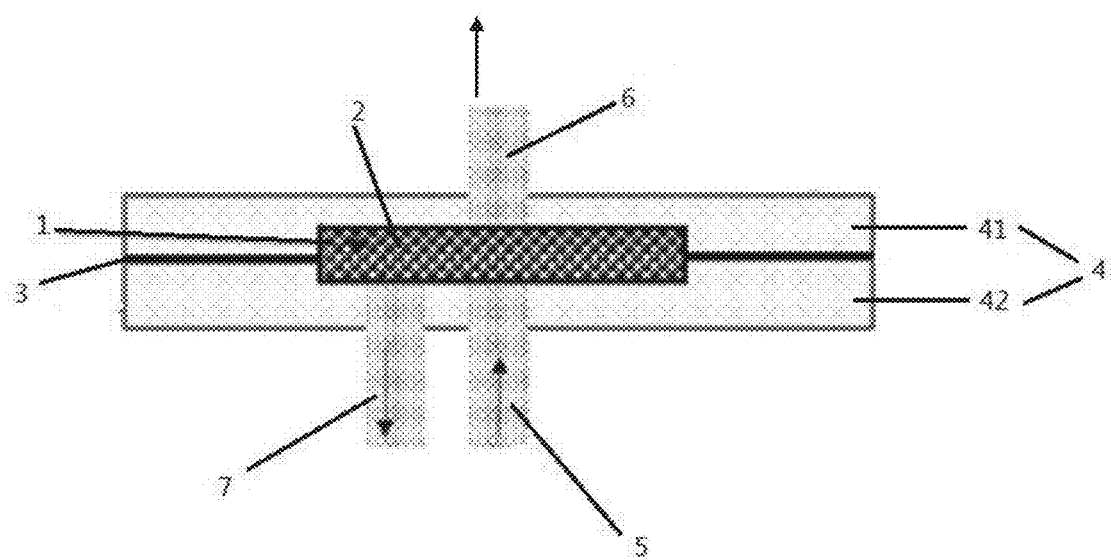
FIG. 2 illustrates a schematic view of a structure of a functional fluid gating control system of an embodiment of the present disclosure.

Referring to FIG. 1, a functional fluid gating control system of the present disclosure comprises a functional fluid 1 and a porous membrane 2. The functional fluid 1 at least partially infiltrates the porous membrane 2 and cooperates to form a fluid gating pathway. The functional fluid 1 seals the porous membrane 2 in a closed state. In operation, when a stimulus is applied to the functional fluid 1 and/or the porous membrane 2, and the functional fluid 1 and/or the porous membrane 2 undergo physical changes or chemical change by responding to the stimulus so as to change the gating pressure of the transport substance. When the applied pressure matches the threshold pressure of the transport fluid 8 to pass through the fluid gating pathway by changing the intensity of the stimulus, and the inner wall of the hole of the porous membrane 2 forms small holes opened by the functional fluid 1, thereby controlling the transport fluid 8 to pass through the system. Referring to FIG. 2, as an example, the functional fluid gating control system further comprises a body having a chamber, and the functional fluid 1 and the porous membrane 2 are disposed in the chamber. Specifically, the body comprises a sealing material 3 and a clamping device 4. The clamping device 4 comprises an upper clamping member 41 and a lower clamping member 42, and the sealing material 3 is fitted to define the chamber between the upper clamping member 41 and the lower clamping member 42. In addition, the chamber can be realized in other ways. The chamber has a material transport inlet 5 and a material separation outlet 6 respectively located on opposite sides of the fluid gating pathway, and a material transport outlet 7 is on the same side of the porous membrane 2 as the material transport inlet 5. The transport fluid 8 enters the chamber from the material transport inlet 5 and is output by the material separation outlet 6, and controllable transport can be achieved by applying stimulation. When the transport fluid 8 is mixed to form a mixed fluid comprising multi-components, that is, the mixed fluid comprising the multi-components enters the material transport inlet 5, and reaches the threshold pressure of one of the components, the one of the components is transported through the material separation outlet 6, the remaining components flow out from the material transport outlet 7, and substance separation can be achieved.

Figure 3:
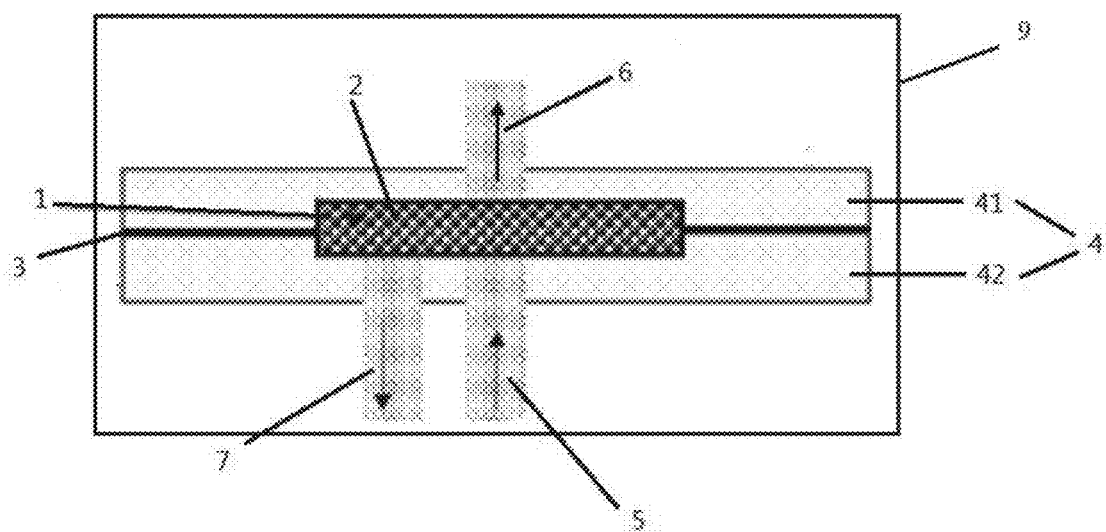
FIG. 3 illustrates a schematic diagram of the functional fluid gating control system applied with an external field of the embodiment of the present disclosure.

The stimulus of the present disclosure can be a physical stimulus or a chemical stimulus. Referring to FIG. 3, the physical stimulus is an external field 9 acting on the functional fluid 1 and/or the porous membrane 2. The external field 9 can be, for example, optical, magnetic, acoustic, electrical, temperature, stress, etc., implemented by an external field generating device or naturally, the implementation is not limited.

Embodiment 1

A functional fluid 1 being light-responsive, which is, but not limited to, azobenzene, stilbene, spiropyran, an ionic liquid, the like is selected. For example, a polymethacrylate-based block copolymer containing spiropyran. The fluid is configured to switch between an amphiphile and a double hydrophilic of a head-based block copolymer when a conformational transformation is induced by light. A configuration of spiropyran transforms into a hydrophilic cyanin configuration under the ultraviolet light, which returns to a hydrophobic spiropyran configuration under the visible light. The functional fluid 1 having light responsiveness is injected into a porous membrane 2 (e.g., a copper mesh) and sealed by an apparatus of FIG. 2. Gas and a liquid being immiscible with the functional fluid 1, or different fluids (which are immiscible with the functional fluid 1) is introduced from a material transport inlet 5. An ultraviolet light or visible light is applied and a wavelength and a frequency of ultraviolet light or visible light are changed to adjust the critical pressure of the transport fluid 8 so that material separation is achieved.

Embodiment 2

Figure 4:
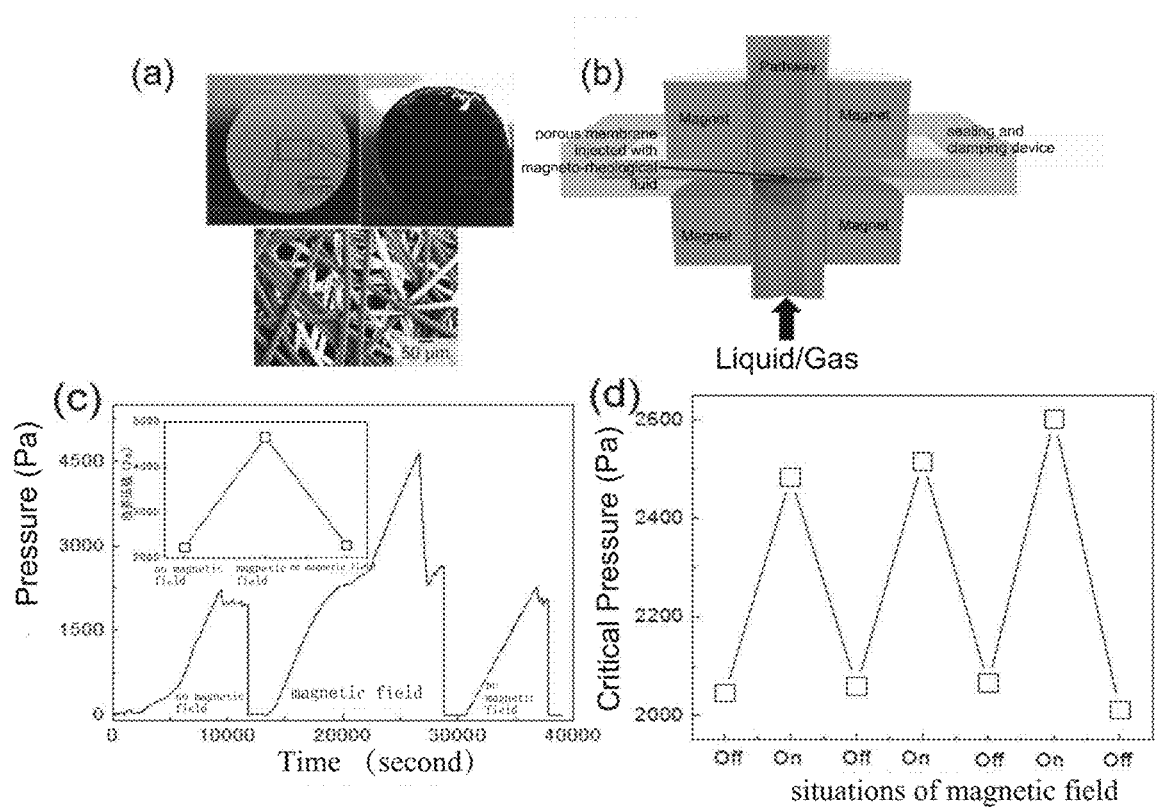
FIG. 4 illustrates a schematic diagram of the structure and performance of the functional fluid gating control system based on a magnetically responsive functional fluid of Embodiment 2, wherein (a) is a photograph and a scanning electronic micrograph of a porous membrane of PTFE and a porous membrane injected with a magnetorheological fluid, (b) is a schematic diagram of a mechanism, and (c) and (d) are effects of the magnetorheological fluid gate applied with a static magnetic field and a dynamic magnetic field, respectively.

A magnetorheological fluid or a ferrofluid as a functional fluid 1 is injected into the porous membrane 2 and sealed by the apparatus as shown in FIG. 2. A mixture of gas and water or a mixture of different fluids (which are immiscible with the functional fluid 1) is introduced from the material transport inlet 5. A magnetic field (a source of the magnetic field is provided by a permanent magnet or an electromagnet) is applied, a magnitude and a direction of the magnetic field is adjusted, and a pressure of a magnetorheological fluid gate or a ferrofluid gate is adjusted. Since the threshold pressures of gas and water (different fluids) passing through the functional fluid gate are different, a viscosity or a microstructure of the fluid can be changed by changing magnetic field strength, so that a pressure of materials passing through the functional fluid gate can be adjusted to achieve material separation. Further, referring to FIG. 4, (a) is a photograph and a scanning electron micrograph of a porous membrane of polytetrafluoroethylene (PTFE) and a porous membrane in which a magnetorheological fluid is injected, (b) is a schematic diagram of a mechanism in which a sealing clamp is the main body, and (c) and (d) are effects of the magnetorheological fluid gate applied with a static magnetic field and a dynamic magnetic field respectively. Using the permanent magnet as the source of the magnetic field, a certain strength of the magnetic field is applied to increase the critical pressures of the gas and the liquid passing through the magnetorheological fluid gate. When the multilayer film is superimposed, the magnetic field plays a similar role in gating. By separately applying constant pressures to achieve critical pressures of the gas and the liquid, the gas can be separated from a separation outlet and the liquid can be separated from a material transport outlet.

Embodiment 3

A non-Newtonian fluid being sensitive to sound waves or ultrasonic waves as the functional fluid 1 is injected into a porous membrane 2 (such as a copper mesh) and sealed by the apparatus shown in FIG. 2. The non-Newtonian fluid comprises, for example, a cornstarch solution, a $SiO_2$ suspension, a copper-based lubricating oil, a waxy crude oil, a polymer solution, etc. A mixture of gas and a fluid being immiscible with the functional fluid 1, or different fluids (which are immiscible with the functional fluid 1) is introduced from the material transport inlet 5. Sound waves or ultrasonic waves as the external field 9 are applied, a frequency or a power of the sound waves or the ultrasonic waves is adjusted, and the pressure of the functional fluid gate is adjusted so that the material separation is achieved.

Embodiment 4

A functional fluid 1 being electric responsive, which includes but is not limited to, an electrorheological fluid, an ionic liquid, a liquid metal, etc. is injected into the porous membrane 2 and sealed by the apparatus shown in FIG. 2. A mixture of gas and water, or different fluids (which are immiscible with the functional fluid 1) is introduced from the material transport inlet 5. An electric field as the external field 9 is applied to change the viscosity of the electrorheological fluid or a form of the liquid metal, and therefore to change the critical pressures of the transport substances.

Embodiment 5

Liquid paraffin as a functional fluid 1 is dissolved into a copper mesh to form a gate comprising paraffin and sealed by the apparatus shown in FIG. 2. A mixture of gas and water, or different fluids (which are immiscible with functional fluid 1) is introduced from the material transport inlet 5, the system is placed into a temperature control system, and a fluid state of the paraffin is adjusted by changing the temperature. At different temperatures, a critical pressure of the gas and the water (or the different fluids) passing through the gate are different. A temperature that maximizes a difference in the critical pressures between the gas and the water (or the different fluids) is selected, and the material separation is achieved.

Embodiment 6

A functional fluid 1 being stress-responsive is injected into the porous membrane 2 and sealed by the apparatus shown in FIG. 2. The functional fluid 1 comprises but is not limited to, a non-Newtonian fluid comprising, for example, a cornstarch solution, a $SiO_2$ suspension, a copper-based lubricating oil, a waxy crude oil, a polymer solution, etc. The porous membrane 2 comprises but is not limited to, a metal film, a polymer film, a ceramic film, or a composite film. A mixture of gas and water, or a mixture of different fluids (which are immiscible with functional fluid 1) is introduced from the material transport inlet 5, a non-contact vibration source as the external field 9, which comprises a non-contact vibration, sound waves, ultrasonic waves, etc. is applied, and an intensity or a frequency of the vibration is adjusted to change the pressure of the functional fluid gate so that the material separation is achieved.

Embodiment 7

A functional fluid 1 is injected into the porous membrane 2 and sealed by the apparatus shown in FIG. 2. The functional fluid comprises but is not limited to, a pH-responsive fluid, an ion responsive fluid, or a biomolecule responsive fluid. The porous membrane 2 comprises but is not limited to, a porous membrane such as PTFE, polyvinylidene difluoride (PVDF), polypropylene (PP), nylon, etc. Taking the pH-responsive fluid (comprising but not limited to triethanolamine, a $Ca(OH)_2$ solution, tertiary amine type gemini surfactant Cm-A-Cm (m=8, 10, 12, 14), etc.) as an example, triethanolamine is selected as the functional fluid 1, a mixture of gas and a liquid (which is not compatible with the functional fluid 1), or a mixture of different fluids (which are immiscible with the functional fluid 1) is introduced from the material transport inlet 5, and a pH of the functional fluid 1 is adjusted to change a pressure of the functional fluid gate so that the material separation is achieved.

Embodiment 8

A material of a porous membrane 2 is selected to be light-responsive. The porous membrane 2 comprises but is not limited to, a metal-organic framework compound porous membrane modified by azobenzene derivatives, a porous membrane modified by liquid crystal polymers, etc. Taking the metal-organic framework compound porous membrane modified by azobenzene derivatives as an example, a lubricating oil is injected into the porous membrane 2 as the functional fluid 1 and sealed by the apparatus of FIG. 2. The lubricating oil comprises but is not limited to, a Fluorine-containing lubricating oil, an engine oil, a silicone oil, etc. A mixed gas of $H_2$ and $CO_2$ is introduced from the material transport inlet 5, and a light source is adjusted. By way of example, by adjusting an irradiation circulation of ultraviolet light/visible light, a ratio of cis groups and trans groups of azobenzene groups will be changed, thereby a permeability and a separation factor of the porous membrane to different gases is adjusted.

Embodiment 9

A material of a porous membrane 2 is selected to be magnetic responsive. The material of the porous membrane 2 comprises but is not limited to, a Ni mesh, a Fe mesh, a Co mesh, or an alloy material thereof, or a polymeric porous membrane embedded with magnetic particles. A lubricating oil as a functional fluid 1 is injected into the porous membrane 2, such as a Fluorine-containing lubricating oil, an engine oil, a silicone oil, or the like, and sealed by the apparatus of FIG. 2. A mixture of gas and water, or a mixture of different fluids (which are immiscible with the functional fluid 1) is introduced from the material transport inlet 5, and a magnetic field is applied so that diameters of pores of the porous membrane 2 change continuously with a strength change and a direction change of the magnetic field, thereby the critical pressure of the transport substance is changed to achieve the material separation.

Embodiment 10

A material of a porous membrane 2 is selected to be sound responsive. The material of the porous membrane 2 comprises but is not limited to, a composite porous membrane comprising a nanogold particle, poly(allylamine hydrochloride) (PAH), or poly(styrene sulfonate) (PSS). A lubricating oil as the functional fluid 1 is injected into the porous membrane 2 and sealed by the apparatus of FIG. 2. The lubricating oil comprises, for example, Fluorine-containing lubricating oils, engine oils, silicone oils, etc. A mixture of gas and water, or a mixture of different fluids (which are immiscible with the functional fluid 1) is introduced from the material transport inlet 5, and sound waves or ultrasonic waves are applied. Diameters of pores of the porous membrane 2 change continuously with a power change or a frequency change of the sound wave or the ultrasonic wave, thereby a pressure of the functional fluid gate is changed to achieve the material separation.

Embodiment 11

Figure 5:
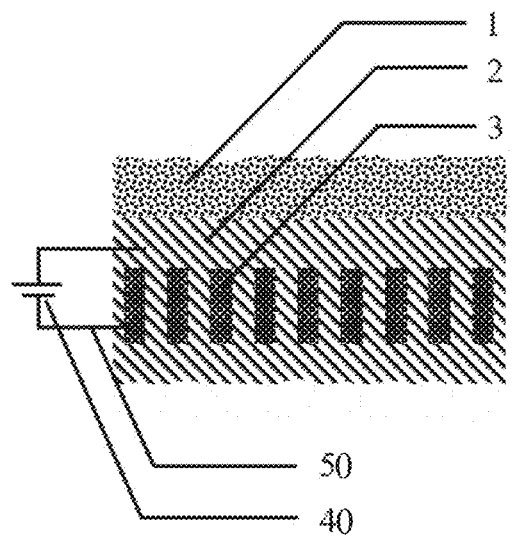
FIG. 5 illustrates a schematic diagram of a mechanism of an electrically responsive porous membrane of Embodiment 11.

As shown in FIG. 5, a material of a porous membrane 2 is selected to be electrically responsive. The material of the porous membrane 2 comprises but is not limited to, Ni mesh, Fe mesh, Co mesh, or alloy materials thereof, a composite film of a conductive polymer, etc. A functional fluid 1 is injected into the material of the porous membrane 2. The functional fluid 1 comprises but is not limited to, Fluorine-containing lubricating oils, engine oils, silicone oils, and the like. An electric field is applied to the system by a power output device 40 and a circuit 50. A wettability of the functional fluid 1 on the porous membrane 2 changes continuously with a change of the external electric field, so that a pressure of the functional fluid gate changes when a transport fluid 8 passes through, thereby a controlled transport of materials and separated transports of multi-components are achieved. The functional fluid 1 is a fluid being immiscible with the transport fluid 8, and the transport fluid 8 can be a single component fluid or a multi-component fluid.

Embodiment 12

A porous membrane 2 is selected to be temperature responsive. The porous membrane 2 comprises but is not limited to a porous membrane comprising PTFE, PVDF, PP, nylon, etc. modified by polyisopropyl acrylamide (PNIPAM). A functional fluid 1 is injected into the porous membrane 2 and sealed by the apparatus of FIG. 2. The functional fluid 1 comprises but is not limited to, Fluorine-containing lubricating oils, engine oils, silicone oils, etc. A mixture of gas and water, or a mixture of different fluids (which are immiscible with the functional fluid 1) is introduced from the material transport inlet 5, and a temperature is changed. Diameters of pores of the porous membrane 2 change continuously with the temperature, thereby a pressure of the functional fluid gate is changed to achieve the material separation.

Embodiment 13

Figure 6:
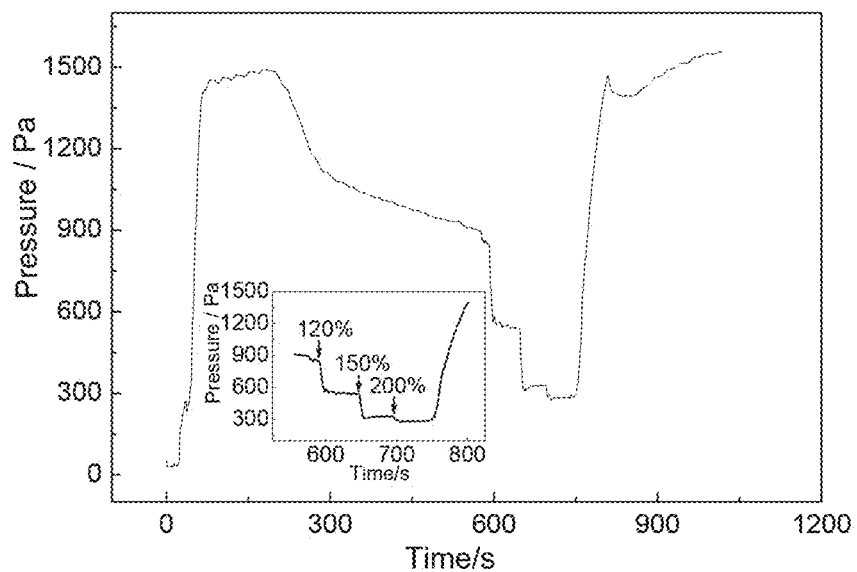
FIG. 6 illustrates a diagram of a pressure test of a functional fluid gating control system based upon a stress-responsive porous membrane of Embodiment 13.

An elastomeric film being stress-responsive is selected. The elastomeric film comprises but is not limited to, silicone resin, Ecoflex®, 3M®VHB, etc. A porous membrane 2 is prepared by a laser etching method or a reverse replica method. A lubricating oil is injected into the porous membrane 2 as a functional fluid 1, such as a silicone oil, a liquid paraffin oil, etc., and sealed by the apparatus of FIG. 2, noting that materials used for the sealing (a sealing material 3 and the clamping device 4) are made of an elastomeric material (such as a silica gel plate, a flexible gel, etc.). A mixture of water and gas, or a mixture of different fluids (which are immiscible with the functional fluid 1) is introduced from the material transport inlet 5, and a tensile force applied to the device is changed to adjust sizes and shapes of pores of the elastomeric film. A pressure of the functional fluid gate (test results are shown in FIG. 6) is changed to achieve the material separation.

Embodiment 14

Porous materials of the porous membrane 2 modified by a plasma grafting method with functional molecules are formed. The functional molecules comprise but are not limited to polyvinylpyrrolidone (PVP), polyacrylic acid (PAA), poly(N-isopropylacrylamide), poly-4-vinylpyridine polybutyl n-butyl acrylate-b-Poly(2-N,N-diethylamino) ethyl methacrylate (PnBA-b-PDEAEMA) being pH-responsive, ion responsive functional molecules, or biomolecular responsive functional molecules, which comprises but is not limited to a surface or an inner side of pores of the porous membrane comprising such as PTFE, PVDF, PP, nylon or the like. The functional fluid 1 is injected into the porous membrane 2 and sealed by the apparatus of FIG. 2. The functional fluid 1 comprises but is not limited to, a Fluorine-containing lubricating oil, an engine oil, a silicone oil, etc. A mixture of gas and a liquid (which is immiscible with functional fluid 1) or a mixture of different fluids (which are immiscible with functional fluid 1) is introduced from the material transport inlet 5, the pH, an ion concentration, or a biomolecule concentration is changed to adjust a selectivity of the porous membrane so that the pressure of the functional fluid gate is adjusted to achieve the material separation.

Embodiment 15

A functional fluid 1 having a light response and a porous membrane 2 having a light response are selected. The functional fluid 1 comprises but is not limited to, a light-sensitive liquid such as azobenzenes, stilbenes, spiropyrans, or ionic liquids. The porous membrane 2 comprises but is not limited to, a metal-organic skeleton compound porous membrane modified with an azobenzene derivative, a liquid crystal polymer modified porous membrane, or the like. Taking a polymethacrylate-based block copolymer liquid comprising a spiropyran in a linear liquid crystal polymer molecular film as an example, the functional fluid 1 can undergo a conformational transformation under the introduction of light to be transferred between the amphiphile and the double hydrophilic head-based block copolymer, and the porous membrane 2 undergoes a conformational transformation under the introduction of light to form an asymmetric deformation. The functional fluid 1 is injected into the metal-organic skeleton compound porous membrane modified with an azobenzene derivative and sealed according to the apparatus of FIG. 2. A mixture of gas and a liquid (which is immiscible with the functional fluid 1) or a mixture of different fluids (which are immiscible with functional fluid 1) is introduced from the material transport inlet 5, ultraviolet light or visible light is applied, and the pressure of the functional fluid gate is adjusted by adjusting the wavelength and the frequency to achieve the material separation.

Embodiment 16

A functional fluid 1 having a magnetic response and a porous membrane 2 having a magnetic response are selected. The functional fluid 1 comprises but is not limited to, a magnetorheological fluid or a magnetic fluid. The porous membrane 2 comprises but is not limited to, Ni mesh, Fe mesh, Co mesh or alloy materials thereof or polymeric porous membranes embedded with magnetic particles. The functional fluid 1 is injected into the porous membrane 2 and sealed according to the apparatus of FIG. 2. A mixture of gas and a liquid (which is immiscible with the functional fluid 1) or a mixture of different fluids (which are immiscible with the functional fluid 1) is introduced from the material transport inlet 5, the pressure of the functional fluid gate is adjusted by applying a magnetic field, and the strength or direction of the magnetic field is adjusted to achieve the material separation.

Embodiment 17

A functional fluid 1 having an acoustic response and a porous membrane 2 having an acoustic response are selected. The functional fluid 1 comprises but is not limited to, non-Newtonian fluids that are sensitive to acoustic wave transmission. The porous membrane 2 comprises but is not limited to, composite porous membranes comprising nano-gold particles, PAH, or PSS. The functional fluid 1 is injected into the porous membrane 2 and sealed according to the apparatus of FIG. 2. A mixture of gas and a liquid (which is immiscible with the functional fluid 1) or a mixture of different fluids (which are immiscible with the functional fluid 1) is introduced from the material transport inlet 5, the pressure of the functional fluid gate is adjusted by applying sound waves or ultrasonic waves, and the intensity or direction of the sound field is adjusted to adjust to achieve the material separation.

Embodiment 18

A functional fluid 1 having an electrical response and a porous membrane 2 having an electrical response are selected. The functional fluid 1 comprises but is not limited to, an electrorheological fluid or a liquid metal. The porous membrane 2 comprises but is not limited to, Ni mesh, Fe mesh, Co mesh, or alloy materials thereof, conductive polymer composite films thereof, etc. The functional fluid 1 is injected into the porous membrane 2 and sealed according to the apparatus of FIG. 2. A mixture of gas and a liquid (which is immiscible with the functional fluid 1) or a mixture of different fluids (which are immiscible with the functional fluid 1) is introduced from the material transport inlet 5, the pressure of the functional fluid gate is adjusted by applying an electric field on the functional fluid 1 and the porous membrane 2 by non-contact or direct contact, and the intensity of the electric field is adjusted to achieve the material separation.

Embodiment 19

A functional fluid 1 having a temperature response and a porous membrane 2 having a temperature response are selected. The functional fluid 1 comprises but is not limited to, a paraffin wax. The porous membrane 2 comprises but is not limited to, porous membranes with polyisopropylacrylamide (PNIPA) modification such as PTFE, PVDF, PP, nylon, etc. The functional fluid 1 is injected into the porous membrane 2 and sealed according to the apparatus of FIG. 2. A mixture of gas and a liquid (which is immiscible with the functional fluid 1) or a mixture of different fluids (which are immiscible with the functional fluid 1) is introduced from the material transport inlet 5, and the functional fluid 1 and the porous membrane 2 are simultaneously changed to generate a temperature response by changing the temperature to regulate the pressure of the functional fluid gate to achieve the material separation.

Embodiment 20

A functional fluid 1 having a stress response and a porous membrane 2 having a stress response are selected. The functional fluid 1 comprises but is not limited to, non-Newtonian fluids such as cornstarch solutions, $SiO_2$ suspensions, copper-based lubricating oils, waxy crude oils, polymer solutions, etc. The porous membrane 2 comprises but is not limited to, silicone resins, Ecoflex®, 3M®VHB, etc. The functional fluid 1 is injected into the porous membrane 2 and sealed according to the apparatus of FIG. 2. A mixture of gas and a liquid (which is immiscible with the functional fluid 1) or a mixture of different fluids (which are immiscible with the functional fluid 1) is introduced from the material transport inlet 5. By simultaneously applying a non-contact vibration source and a stretching stress on the porous membrane 2, the functional fluid 1 and the porous membrane 2 generate a stress response to regulate the critical pressure of the functional fluid gate to achieve the material separation.

Embodiment 21

A functional fluid 1 having a chemical response and a porous membrane 2 having a chemical response are selected. The function fluid 1 comprises but is not limited to, functional fluids that respond to pH, ions or biomolecules, such as triethanolamine, $Ca(OH)_2$ solution, tertiary amine type gemini surfactant Cm-A-Cm (m=8, 10, 12, 14), etc. The porous membrane 2 comprises but is not limited to, a porous membrane modified by plasma grafting with functional molecules having pH response, ionic or biomolecular response, for example, polyvinylpyrrolidone (PVP), polyacrylic acid (PAA)), poly(N-isopropylacrylamide), poly-4- vinylpyridine polybutyl n-butyl acrylate-b-poly(2-N,N-diethylamino)ethyl methacrylate (PnBA-b-PDEAEMA) and other functional molecules, etc. The functional fluid 1 is injected into the porous membrane 2 and sealed according to the apparatus of FIG. 2. A mixture of gas and a liquid (which is immiscible with the functional fluid 1) or a mixture of different fluids (which are immiscible with the functional fluid 1) is introduced from the material transport inlet 5. By changing the pH, the ion concentration, or the concentration of the biomolecules, selectivity of the functional fluid 1 and the porous membrane 2 change to achieve the material separation.

It will be apparent to those skilled in the art that various modifications and variations can be made in the present disclosure without departing from the spirit or scope of the invention. Thus, it is intended that the present disclosure cover the modifications and variations of this invention provided they come within the scope of the appended claims and their equivalents.

What is claimed is:

1. A functional fluid gating control system, comprising:
    a porous membrane and a functional fluid, wherein:
        the functional fluid at least partially infiltrates the porous membrane and cooperates to form a fluid gating pathway,
        at least one of the functional fluid or the porous membrane responds to at least one external stimulus other than from contacting a transport fluid and undergoes a physical change or a chemical change to change a pressure of the fluid gating passage to control the a transport fluid to pass through the fluid gating pathway, and
        the transport fluid and the functional fluid are immiscible.

2. The functional fluid gating control system according to claim 1, further comprising:
    an external field acting on the at least one of the functional fluid or the porous membrane, wherein a change in the external field forms the at least one external stimulus.

3. The functional fluid gating control system according to claim 2, wherein the external field comprises at least one of the following external field: optical field, magnetic field, acoustic field, electrical field, temperature, non-contact vibration, or tensile force.

4. The functional fluid gating control system according to claim 2, wherein hydrophilicity, viscosity, or morphology of the functional fluid changes as the external field changes.

5. The functional fluid gating control system according to claim 2, wherein a pore size, a chemical structure, or wettability of the porous membrane changes as the external field changes.

6. The functional fluid gating control system according to claim 1, wherein the at least one of the functional fluid or the porous membrane responds to a chemical stimulus.

7. The functional fluid gating control system according to claim 6, wherein the chemical stimulus comprises a change in ion concentration or biomolecular concentration.

8. The functional fluid gating control system according to claim 1, further comprising:
    a body having a chamber, wherein:
        the porous membrane and the functional fluid are disposed in the chamber,
        the chamber comprises a material transport inlet and a material separation outlet located on opposite sides of the fluid gating pathway,
        the transport fluid enters the chamber from the material transport inlet, and
        the transport fluid is transported from the material separation outlet.

9. The functional fluid gating control system according to claim 8, wherein:
    the chamber further comprises a material transport outlet,
    the material transport outlet and the material transport inlet are located on a side of the porous membrane,
    a fluid mixture with at least two components is introduced into the chamber from the material transport inlet, and
    a component other than the transport fluid flows from the material transport outlet to achieve material separation.

10. The functional fluid gating control system according to claim 8, wherein:
    the body comprises a sealing material and a clamping device,
    the clamping device comprises an upper clamping member and a lower clamping member,
    the sealing material is disposed between the upper clamping member and the lower clamping member to form the chamber.

11. The functional fluid gating control system according to claim 4, wherein a pore size, a chemical structure, or wettability of the porous membrane changes as the external field changes.

12. The functional fluid gating control system according to claim 1, wherein the at least one external stimulus is at least one non-contact external stimulus.

13. The functional fluid gating control system according to claim 1, wherein the functional fluid is a non-Newtonian fluid.

14. The functional fluid gating control system according to claim 12, wherein the at least one non-contact external stimulus is an optical field, a magnetic field, an acoustic field, or non- contact vibration.

* * * * *